UNITED STATES PATENT OFFICE.

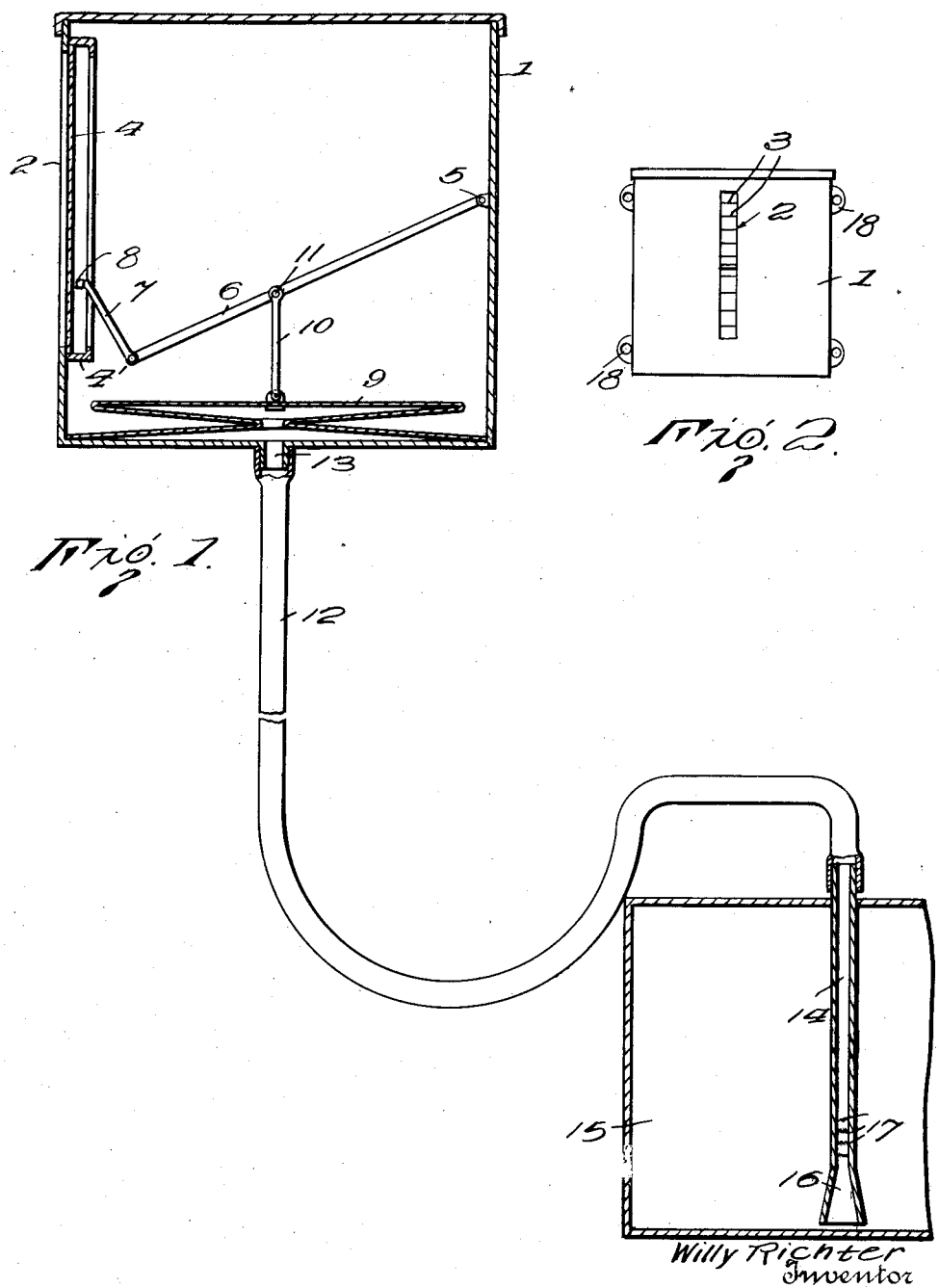

WILLY RICHTER, OF OLMSTED, ILLINOIS.

FLUID-GAGE.

1,391,077.  Specification of Letters Patent.  Patented Sept. 20, 1921.

Application filed March 14, 1918, Serial No. 222,362. Renewed July 30, 1920. Serial No. 400,210.

*To all whom it may concern:*

Be it known that I, WILLY RICHTER, a citizen of the United States, residing at Olmsted, in the county of Pulaski and State of Illinois, have invented certain new and useful Improvements in a Fluid-Gage, of which the following is a specification.

This invention relates to improvements in fluid gages and it is the principal object of the invention to provide a gage having an expansible element or diaphragm arranged therein and connected with the registering or indicating means of the same in a manner to cause operation of such means upon variation of the liquid level in a tank or other form of container to which the device may be connected, and its registration with the proper graduations arranged on the gage, thus enabling a person to accurately ascertain the contents of the tank.

The invention also aims to provide the gage with a novel form of indicating means which will immediately respond to the slightest movement of the expansible element, whereby to indicate the exact quantity of the liquid contents of the tank.

In order that the invention and the manner of its application may be readily understood by those skilled in the art, I have, in the accompanying illustrative drawings and in the detailed following description based thereon, set forth the preferred embodiment of the invention.

In these drawings:

Figure 1 is a vertical section through the improved gage and a portion of the tank, and Fig. 2 is a reduced elevation of the gage.

Having more particular reference to the drawings, in connection with which like reference characters will designate corresponding parts throughout the several views, 1 represents the casing of the improved fluid gage, the front wall of which is provided with a vertically disposed elongated slot 2 having a transparent covering arranged thereover, which covering, as will be noted, is provided with a series of graduations 3 pertaining to the fluid measure. Secured to the inner side of the front wall of the casing 1 adjacent the elongated slot 2 is a slotted guide element 4, for a purpose which will be hereinafter apparent.

To the inner side of the rear wall of the casing 1 there is pivotally connected as at 5 a lever 6, the free end of which has an arm 7 pivotally connected thereto, which arm carries a transversely disposed indicator 8 receivable in the vertically disposed guide 4 and adapted to be moved therein in order that the same may register with the various graduations 3 arranged on the transparent cover. In this connection, it will be noted that the arm 7 is passed through the slot formed in the vertically disposed guide element 4 and as a consequence, will be permitted to move freely therein.

Positioned in the lower portion or bottom of the casing 1 is an expansible element or diaphragm 9, the upper portion of said diaphragm carrying a pivotally connected rod 10, the remaining end of which is pivotally connected as at 11 to the intermediate portion of the lever 6.

With a view toward providing means for establishing communication between the gage and a tank or other form of container, a conduit 12 is provided and is connected to a nipple 13 formed upon the bottom of the gage casing 1; the remaining end of said conduit being connected to a pipe 14 and is arranged in the fluid containing tank 15, the lower portion of said pipe 14 being flared outwardly or enlarged as at 16.

To prevent "slushing" of the liquid contents of the tank, that is, splashing of the same to such an extent as to cause undue movement of the indicator 8 with relation to the graduations 3 arranged on the transparent cover, a plurality of perforate disks generally indicated by the numeral 17 may be and preferably are arranged in the pipe 14 or the conduit 12.

To facilitate the securing of the gage to a suitable support, apertured ears 18 may be and preferably are arranged upon the sides of the casing 1 and as will be understood, are adapted to receive fastening devices of a suitable nature therethrough.

In operation and assuming that the improved gage is connected to a liquid containing tank, such air as is normally contained in the tube or conduit arranged in the tank is forced upwardly through the conduit 12 into engagement with the expansible element or diaphragm 9, thereby moving the lever 6 and the indicator 8 upwardly in the slotted guide element 4 to indicate that said tank is full. As the level of the liquid decreases, the air in the diaphragm 9 will be gradually returned to the conduit 12 and the pipe 14, thereby allowing the indicator 8 to lower in a corresponding manner with relation to the graduations 3 arranged on the transparent cover. "Slushing" or splashing of the liquid contents of the tank will be prevented from causing undue movement or fluctuation of the indicator 8, by reason of the interpositioning of the various perforate disks 17, hence, rendering the gage effectual and accurate.

While I have herein shown and described the preferred embodiment of the invention, I do not wish to be understood as confining said invention to this embodiment, nor to the exact construction, arrangement and adaption of parts shown and described, but I reserve the right to make any changes and alterations that fairly fall within the spirit and scope of the invention.

I claim:

1. In a gage, having a casing provided with a vertically disposed elongated slot formed in one wall thereof, a transparent cover for said slot and provided with a series of graduations, a vertical guide arranged on the inner wall of the casing adjacent to said slot, inlet means for the casing, a fluid receiving diaphragm arranged in the casing over said inlet means and adapted to confine the fluid admitted through said means, a conduit engaged with the inlet means and adapted to be extended into a fluid container, a lever mounted for vertical movement in said casing, a rod pivoted to the lever and centrally fixed to said diaphragm, an arm pivotally engaged with the free end of said lever and extending into the slotted guide, and an indicator carried upon the free end of said arm and movable over the graduations.

2. In a gage having a casing provided with an open front wall and a vertical guide contiguous therewith, a graduated, transparent cover for said guide, inlet means in the bottom of said casing, a flexible diaphragm secured in the bottom of said casing over said inlet means and adapted to confine the fluid admitted into the casing, a conduit connected with the inlet means and communicating with a fluid container, a lever pivotally connected at one end to the casing and mounted for vertical movement therein, a rod pivoted to the lever and centrally fixed to said diaphragm, an arm pivotally engaged with the opposite end of said lever and extending into the guide and an indicator carried upon the free end of the said arm and movable over the graduated cover.

In testimony whereof, I affix my signature hereto.

WILLY RICHTER.